No. 651,983. Patented June 19, 1900.
J. D. STIRCKLER.
FASTENER.
(Application filed Feb. 12, 1900.)
(No Model.)

WITNESSES:
A. H. Flannery
G. W. Phillips

INVENTOR:
John D. Strickler
by W. R. V. Down
Atty.

UNITED STATES PATENT OFFICE.

JOHN D. STIRCKLER, OF BOSTON, MASSACHUSETTS, ASSIGNOR TO THE CONSOLIDATED FASTENER COMPANY, OF PORTLAND, MAINE.

FASTENER.

SPECIFICATION forming part of Letters Patent No. 651,983, dated June 19, 1900.

Application filed February 12, 1900. Serial No. 4,857. (No model.)

*To all whom it may concern:*

Be it known that I, JOHN D. STIRCKLER, a citizen of the United States, residing at Boston, in the county of Suffolk and Commonwealth of Massachusetts, have invented a new and useful Improvement in Fasteners, of which the following, taken in connection with the accompanying drawings, is a specification.

My invention relates especially to a separable fastener of the kind now known as a "sew-on" fastener, and it relates both to the socket or female member and to the stud or male member; and it consists of the features hereinafter particularly shown and described in the accompanying drawings, specification, and claims.

Figure 1:
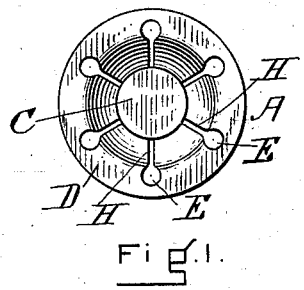
Figure 2:
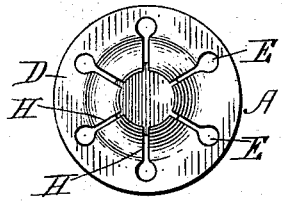
Figure 3:
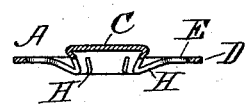
Figure 4:
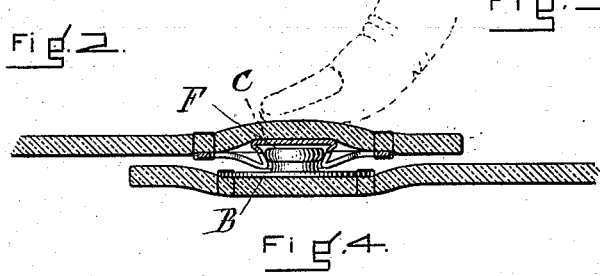
Figure 5:
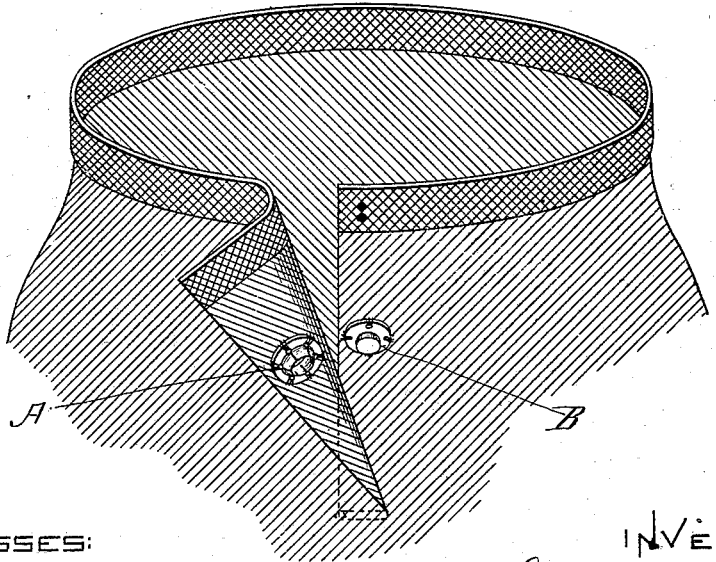

Figure 1 is a plan view of the top of my improved socket member. Fig. 2 is a plan view of the bottom of my improved socket member as the same appears when attached to the under side of the flap. Fig. 3 is a vertical section across the center of my improved socket member. Fig. 4 shows a socket and stud member attached to opposite flaps and united together. Fig. 5 shows my improved socket and stud member attached to opposite flaps ready to be fastened together.

In the drawings, A shows the socket or female member, and B shows the stud or male member.

Heretofore sew-on fasteners of this class have been made in various shapes with an opening through their center, so that as it is desirable to have these sew-on fasteners flat and absolutely close to the flap to which they are attached the stud on entering the opening protrudes through the same. This has been an objectionable feature, as in the operation of this sew-on fastener the thumb or finger is placed on top of the socket member to either hold it in position or to press it down upon the stud. This operation produces two defects—viz., it hurts the operator by injuring the end of the finger resting against the edges of the socket or coming in contact with the incoming stud. It also prevents the locking of the stud member with the female member, as the pressure of the finger has the tendency of preventing the stud from entering the female member. In my improved socket member I have made what I have called a "finger" or "thumb" rest C. This I preferably make flat, as shown in Fig. 3. I have also provided my socket member with what I term a "flap-rest" D, so that the fastener may rest snugly and firmly against the flap, to which it is attached by means of sewing through the holes E E.

As the socket-chamber of my improved socket member is necessarily low, I make the top of my stud member B flat, as shown in Fig. 4 at F.

It will be seen that the inside of the socket member (shown in Fig. 2) is substantially flat, lying in the plane substantially with that of the flap to which it is attached.

In my improved construction I have shown that the holes E E, which are used to sew the socket member to the flap, terminate in the slits H, which extend into the walls of the socket-chamber. These slits H not only cause the socket member to be resilient, but are useful in the manufacture of the socket-chamber in cheaply and economically getting the shape desired and the flatness preferable in the thumb or finger rest. If desired, a resilient stud can be used, in which case any resiliency in the socket member would be unnecessary.

It will be noticed that both the socket and stud members are struck up integral from a single piece of metal.

My improved sew-on fastener obviates two faults which have heretofore existed, both in the attachment of the fastener to the flap, by providing a substantial flat flap-rest, so that the fastener can be snugly and firmly attached to the flap, and also the fault heretofore existing in the operation of the fastener in the act of uniting the stud member to the female member by providing a thumb rest or protection.

What I claim is—

1. In a separable sew-on fastener a socket member provided with a finger or thumb rest C, and a flap-rest D, in combination with a male member, substantially as and for the purpose set forth.

2. In a separable sew-on fastener a complete socket member of a fastener, consisting of a single piece of metal, in combination with a male or stud member, the said socket member being provided with a thumb-rest C, substantially as and for the purpose set forth.

3. In a separable sew-on fastener a complete socket member of a fastener, consisting of a single piece of metal, provided with a thumb-rest C, and a flap-rest D, substantially as and for the purpose set forth.

4. In a separable sew-on fastener a socket member of a fastener, consisting of a single piece of metal, provided with a thumb-rest C, a flap-rest D, and holes E, substantially as and for the purpose set forth.

5. In a separable sew-on fastener a socket member of a fastener, consisting of a single piece of metal, provided with a thumb-rest C, slits H, and holes E, substantially as and for the purpose set forth.

6. In a separable sew-on fastener a complete socket member of a fastener, consisting of a single piece of metal, having a thumb-rest C in combination with a male member B, having substantially a flat top F, as and for the purpose set forth.

In witness whereof I have hereunto set my hand and seal.

JOHN D. STIRCKLER. [L. S.]

Witnesses:
WM. B. H. DOWSE,
A. H. FLANNERY.